United States Patent
Isobe et al.

(10) Patent No.: US 11,873,869 B2
(45) Date of Patent: Jan. 16, 2024

(54) ANGULAR POSITION HOLDING APPARATUS WITH OVERLOAD PREVENTION SYSTEM

(71) Applicant: Origin Company, Limited, Saitama (JP)

(72) Inventors: Taro Isobe, Saitama (JP); Shunichi Watanabe, Saitama (JP)

(73) Assignee: ORIGIN COMPANY, LIMITED, Saitama (JP)

( * ) Notice: Subject to any disclaimer, the term of this patent is extended or adjusted under 35 U.S.C. 154(b) by 132 days.

(21) Appl. No.: 17/602,460

(22) PCT Filed: Dec. 24, 2019

(86) PCT No.: PCT/JP2019/050659
§ 371 (c)(1),
(2) Date: Apr. 18, 2022

(87) PCT Pub. No.: WO2020/208878
PCT Pub. Date: Oct. 15, 2020

(65) Prior Publication Data
US 2023/0175560 A1  Jun. 8, 2023

(30) Foreign Application Priority Data
Apr. 12, 2019  (JP) ................. 2019-076190

(51) Int. Cl.
*F16D 41/20* (2006.01)
*F16D 7/02* (2006.01)
*F16D 49/10* (2006.01)

(52) U.S. Cl.
CPC .......... *F16D 41/206* (2013.01); *F16D 7/022* (2013.01); *F16D 49/10* (2013.01)

(58) Field of Classification Search
CPC ........ F16D 41/206; F16D 49/02; F16D 49/04; F16D 49/08; F16D 49/10; F16D 63/00;
(Continued)

(56) References Cited

U.S. PATENT DOCUMENTS

| 5,771,539 A | 6/1998 | Wahlstedt et al. |
| 2008/0268964 A1* | 10/2008 | Kim ........................ F16D 7/022 464/47 |
| 2012/0298474 A1* | 11/2012 | Ward ....................... F16H 55/36 192/41 S |

FOREIGN PATENT DOCUMENTS

| JP | 2001-208108 | 8/2001 |
| JP | 2004-268758 | 9/2004 |

(Continued)

OTHER PUBLICATIONS

Extended European Search Report dated May 30, 2022 in corresponding European Patent Application No. 19924574.7.
(Continued)

*Primary Examiner* — David R Morris
(74) *Attorney, Agent, or Firm* — Wenderoth, Lind & Ponack, L.L.P.

(57) ABSTRACT

A small and compact rotation transmitter includes a torque limiter and an angular position holding apparatus. An outer race member is installed in a housing, and a coil spring is mounted on the outer peripheral surface thereof. Inside the outer race member, an internal space is formed, and an inner race member is installed concentrically with the outer race member. In the annular space between the outer and inner race members, a thin-plate elastic piece is pressed against the outer and inner race members, and either the outer or inner race member is connected to an input-side device while the other is connected to an output-side device. Even without rotation torque, the position of the output-side device is held by the coil spring. When the rotation torque
(Continued)

A-A CROSS SECTION

B-B CROSS SECTION from the input-side device becomes excessive, slippage occurs on the thin-plate elastic piece, whereby the outer and inner race members are disconnected.

12 Claims, 6 Drawing Sheets

(58) Field of Classification Search
CPC ... F16D 67/00–02; F16D 43/211; F16D 7/022
See application file for complete search history.

(56) References Cited

FOREIGN PATENT DOCUMENTS

| | | |
|---|---|---|
| JP | 3592984 | 11/2004 |
| JP | 2006-265982 | 10/2006 |
| JP | 2015-200062 | 11/2015 |
| JP | 2018-194060 | 12/2018 |
| JP | 2018-194091 | 12/2018 |
| JP | 2019-035430 | 3/2019 |

OTHER PUBLICATIONS

International Search Report dated Mar. 17, 2020 in International (PCT) Application No. PCT/JP2019/050659.

* cited by examiner

A-A CROSS SECTION        B-B CROSS SECTION

Fig. 9

A-A CROSS SECTION        B-B CROSS SECTION

ANGULAR POSITION HOLDING APPARATUS WITH OVERLOAD PREVENTION SYSTEM

TECHNICAL FIELD

The present invention relates to an angular position holding apparatus such as a torque hinge, which is used to support an article turnable about the central axis. In particular, the present invention relates to an angular position holding apparatus equipped with an overload prevention system.

BACKGROUND ART

Some of jumping hatchbacks mounted on the rear end of vehicles such as a wagon or a van can be opened and closed by an electric motor. Patent Document 1 below discloses a hatchback that is activated to switch (open/close) between the fully open position and the fully closed position by an electric motor. When this hatchback is stopped at the fully open position or at the intermediate position between the fully open position and the fully closed position, the hatchback is held by an electromagnetic clutch. In this switching device, even if the drive of the electric motor as the input-side device stops, the hatchback as the output-side device is held by the electromagnetic clutch, and thus, the hatchback will not fall by its own weight.

Patent Document 2 below discloses a torque limiter. The torque limiter disconnects an electric motor as a drive source (input-side device) from a hatchback as a driven member (output-side device), for instance, when some obstacle is caught between the hatchback and a vehicle equipped with the hatchback so as to cause an overload (excessive load torque) on the electric motor, thereby shutting off transmission of rotation torque from the electric motor to the hatchback. Due to the operation of the torque limiter, the article caught between the hatchback and the vehicle equipped with the hatchback can be protected without damage, thereby improving safety.

A so-called torque hinge is a mechanism element for holding the driven member (output-side device) such as a hatchback at a suitable angular position without relying on an electrical unit. The torque hinge indicates a hinge for applying a predetermined resistance torque with respect to a rotating body. The rotating body becomes rotatable when an additional torque not smaller than a predetermined resistance torque is applied. On the other hand, the rotating body is held at the angular position at the time the actuation of the additional torque stops. Patent Document 3 below shows an example of a torque hinge in an application filed by the present applicant prior to the present application.

PRIOR ART DOCUMENTS

Patent Documents

[Patent Document 1] JP-A 2006-265982
[Patent Document 2] JP-A 2004-268758
[Patent Document 3] Japanese Patent No. 3592984

SUMMARY OF THE INVENTION

Problem to be Solved by the Invention

Since a switching device for opening and closing by driving a hatchback of a vehicle with an electric motor has a limited space for installing a device such as an electric motor, it is preferable to downsize as much as possible the device constituting the switching device, thereby providing a compact device. The switching device of Patent Document 1 uses an electromagnetic clutch to hold the hatchback at the time of stopping the electric motor as an input-side device. Since such a switching device requires a space for installing the electromagnetic clutch, it is necessary to separately construct electrical wirings and a control system, and it will result in cost increase.

The switching device of Patent Document 1 is not provided with an overload prevention system. Therefore, if some obstacle is caught between the hatchback as an output-side device and the vehicle equipped with the hatchback, the caught article may be damaged by the drive of the electric motor. Although it is possible to apply the overload prevention system as shown in Patent Document 2 to this switching device, the device will require an additional space for installing the overload prevention system.

The present invention has been accomplished in the light of the aforementioned situations, and a technical object of the present invention is to provide an angular position holding apparatus equipped with an overload prevention system that has a compact and mechanically constituted structure. The angular position holding apparatus is used, for instance, as a switching device of a hatchback for vehicle, and it applies a braking torque when no rotation torque is input from an input-side device, thereby holding the angular position of an output-side device. The angular position holding apparatus is combined with an overload prevention system as a safety device, whereby the angular position holding apparatus of the present invention is configured.

Means for Solving the Problems

In view of the aforementioned object, an angular position holding apparatus of the present invention, which is equipped with a simple device for overload prevention, is constituted by assembling two torque limiters. One of the torque limiters functions as an angular position holding apparatus, and it is configured to apply a braking torque by use of a coil spring so as to prevent rotation by the time a torque equal to or larger than the braking torque acts. This torque limiter is combined with another torque limiter functioning as an overload prevention system, which uses a cylindrically-rolled thin-plate elastic piece and whose rotation torque for initiating a relative rotation is extremely large.

That is, the present invention provides an angular position holding apparatus for achieving the aforementioned technical objects. It is "an angular position holding apparatus for applying a braking torque to hold a position of an output-side device when no rotation torque is input from an input-side device, the angular position holding apparatus comprises an outer race member and an inner race member each rotatable about a common central axis and each having an outer peripheral surface with circular cross section, either the outer race member or the inner race member is connected to the input-side device while the other is connected to the output-side device, a coil spring is mounted on the outer peripheral surface of the outer race member, the coil member in a free state has an inner diameter smaller than the outer diameter of the outer race member, the coil spring has hooks at its both ends that are locked to a fixed member in order to apply braking torque to the outer race member, an internal space having a circular cross section to accommodate the inner race member is formed in the outer race member, and a cylindrically-rolled thin-plate elastic piece is installed between the inner peripheral surface of the outer race member and the outer peripheral surface of the inner race member so that the thin-plate elastic piece is brought into contact with the inner peripheral surface and the outer peripheral surface, the outer race member and the inner race member rotate integrally against the braking torque when a rotation torque input from the input-side device is larger than the braking torque, and the connection between the outer race member and the inner race member by the thin-plate elastic piece is cut off to make the outer race member and the inner race member rotate relatively when a rotation torque larger than the braking torque by at least a predetermined value is generated between the outer race member and the inner race member".

It is preferable in the embodiment of the present invention that "the outer race member is a cylindrical member having an outer peripheral surface with a circular cross section and an internal space with a circular cross section, and the inner race member to be accommodated in the internal space is set to have an axial length not longer than the axial length of the outer race member". It is preferable that a plurality of irregularities are formed on the thin-plate elastic piece.

It is also preferable that the angular position holding apparatus includes a fixed housing for accommodating the outer race member and the inner race member, and the housing is formed with locking grooves into which the hooks at the both ends of the coil spring are to be inserted.

As for the case of providing a housing, the housing can be constituted so that "the housing includes a housing body having an end plate and an outer peripheral wall extending axially from the peripheral edge of the end plate, and a shield plate for sealing the open end of the housing body, axially-locking protrusions and circumferentially-locking protrusions are formed at intervals in the circumferential direction at the open end portion of the outer peripheral wall, and an axially-locking groove corresponding to the axially-locking protrusions and circumferentially-locking grooves corresponding to the circumferentially-locking protrusions are formed on the outer peripheral surface of the shield plate".

Further, it is preferable that a fluorine-based lubricant is encapsulated in the housing.

Effect of the Invention

The angular position holding apparatus of the present invention is provided with an outer race member and an inner race member both of which are rotatable about a common central axis. An input-side device such as an electric motor is connected to the outer race member, and an output-side device such as a hatchback is connected to the inner race member (as described later, it is also possible to connect the output-side device to the outer race member and to connect the input-side device to the inner race member in use). A coil spring is mounted on the outer peripheral surface of the outer race member, so that the outer race member is applied with a braking torque based on the frictional force, just like the case of a coil spring type torque limiter.

When the electric motor on the outer race member side rotates, a torque larger than the braking torque of the coil spring acts on the outer race member, and the outer race member rotates against the braking torque. The outer race member and the inner race member are usually connected to each other via the cylindrically-rolled thin-plate elastic piece, so that rotation of the electric motor opens and closes the hatchback. When the rotation of the electric motor stops, substantially no torque will be applied from the electric motor. However, since the angular positions of the outer race member and the inner race member are held by the braking torque of the coil spring, the hatchback will not fall by its own weight. It is also possible to manually open and close the hatchback while the electric motor is stopped by manually applying a torque not smaller than the braking torque to the hatchback.

In the case where some obstacle such as a human finger is caught between the hatchback and the vehicle in the process of opening and closing the hatchback by an electric motor, an excessive torque (rotation torque larger than the braking torque by at least a predetermined value) is generated in the electric motor. In the present invention, a cylindrically-rolled thin-plate elastic piece is installed between the internal space of the outer race member and the outer peripheral surface of the inner race member. When the excessive torque is generated, slippage occurs between the thin-plate elastic piece and either the outer race member or the inner race member, thereby interrupting transmission of the torque (which is an operation of a torque limiter for overload prevention). In this manner, it is possible to avoid damage on the caught article or damage caused by overcurrent on the electric motor.

In the present invention, a coil spring for holding an angular position is mounted on the outer peripheral surface of the outer race member. Furthermore, in the internal space formed in the outer race member, a cylindrically-rolled thin-plate elastic piece is arranged to function as a torque limiter for overload prevention. That is, the torque limiter for holding the angular position and the torque limiter for overload prevention are installed collectively at the same position of the same member, thereby providing a downsized and compact member for achieving both the functions.

The thin-plate elastic piece constituting the torque limiter for overload prevention is also referred to as a tolerance ring. This is a component to be used also for linking a flanged disc or the like fixedly to a shaft having a circular cross section. Here, even a small cylindrically-rolled thin-late elastic piece having a cross section of a small diameter has a very large spring constant. As a result, even for a downsized angular position holding apparatus of the present invention, it is possible to set a higher value of torque for disconnecting the outer race member and the inner race member (a rotation torque larger than the braking torque by at least a predetermined value).

MODE FOR CARRYING OUT THE INVENTION

Hereinafter, the angular position holding apparatus of the present invention will be described with reference to the attached figures.

Figure 1:
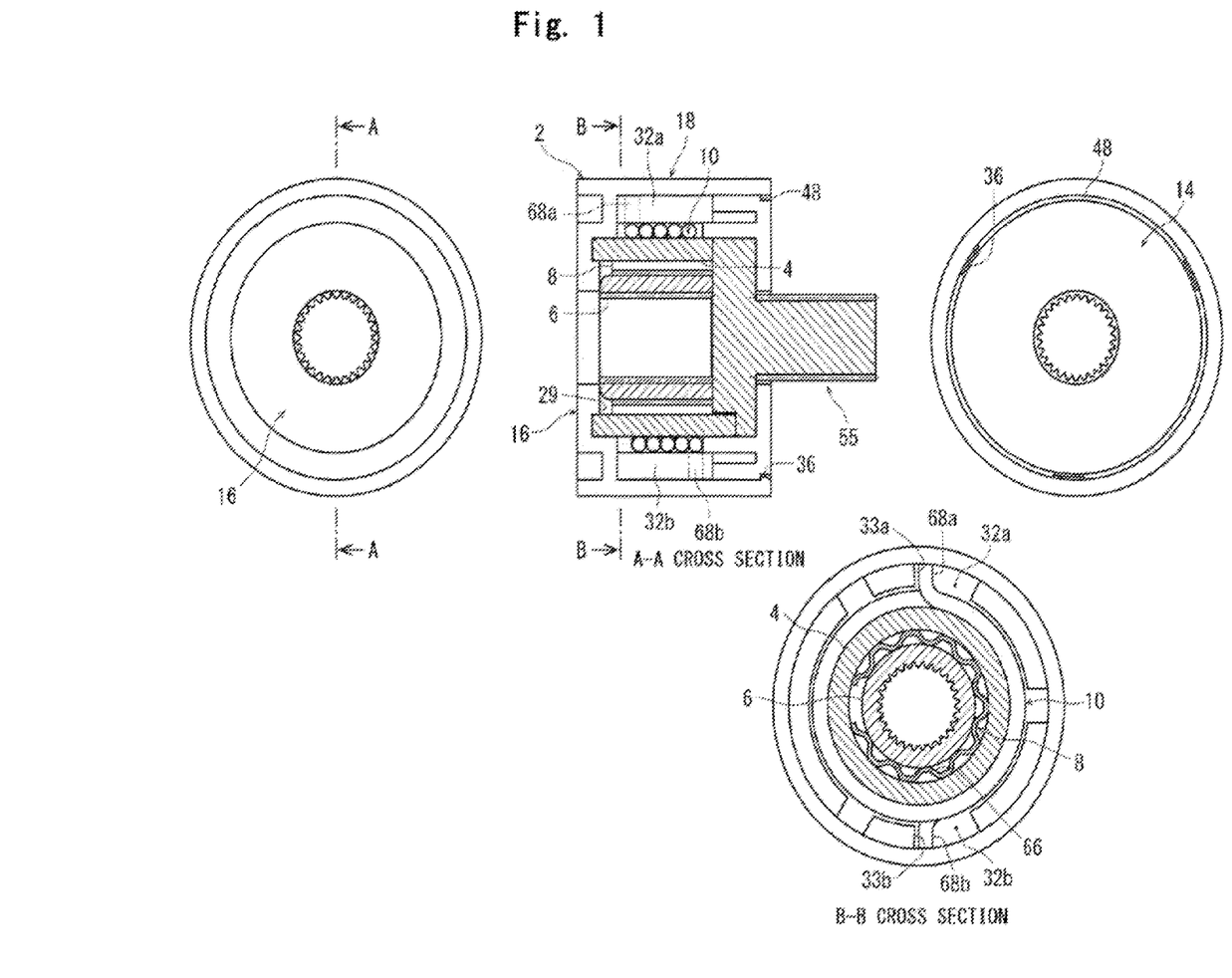
FIG. 1 is composed of diagrams showing a structure of a preferred embodiment of angular position holding apparatus according to the present invention.

The angular position holding apparatus of the present invention shown in FIG. 1 is provided with an overload prevention system. The apparatus includes also a housing 2, an outer race member 4, an inner race member 6, a thin-plate elastic piece 8 to connect the outer race member 4 and the inner race member 6 in a disconnectable manner (i.e., functioning as a torque limiter for overload prevention), and a coil spring to apply a braking torque to the outer race member 4. In the cross-sectional view of FIG. 1, only the outer race member 4 and the inner race member 6 are hatched, and the thin-plate elastic piece 8 is shadowed for facilitating understanding.

The explanation below will be made by referring to FIG. 3 together with FIGS. 1 and 2. The housing 2 is composed of a housing body 12 shown in FIG. 3 (*a*) and a shield plate 14 shown in FIG. 3(*b*). Hereinafter, explanation will be made in detail mainly with reference to FIG. 3(*a*). The housing body 12 is a cup-shaped member composed of an endplate 16 and a cylindrical outer peripheral wall 18 connected to the outer peripheral edge of the end plate 16 and extending in the axial direction. A substantially columnar accommodating space 20 is formed inside the housing body 12 and the other end face axially opposite to the end plate 16 is made open. The end plate 16 includes a circular central portion 24 formed with a circular through hole 22 at its center, a cylindrical intermediate portion 26 standing in the axial direction from the outer peripheral edge of the central portion 24 to the accommodating space 20, and an annular outer periphery 28 extending radially outward from the free edge of the intermediate portion 26 and being connected to the inside of the outer peripheral wall 18. On the inner peripheral edge portion of the central portion 24, an annular ridge 29 protruding axially toward the accommodating space 20 is formed.

On the inner peripheral surface of the outer peripheral wall 18, five arc-shaped ridges 30 protruding radially inward are formed at predetermined intervals in the circumferential direction. The five ridges 30 each extends linearly in an axial direction from the inner surface of the outer periphery 28 of the end plate 16 toward the open end of the outer peripheral wall 18. As shown in B-B cross-sectional view of FIG. 3(*a*), a pair of locking grooves 32*a* and 32*b* having a relatively large circumferential width and three auxiliary grooves 34 having a relatively small circumferential width are provided between the ridges 30 adjacent to each other in the circumferential direction.

The pair of locking grooves 32*a* and 32*b* have the same circumferential width. As shown in the B-B cross-sectional view of FIG. 1, hooks 68*a* and 68*b* at the both ends of the coil spring 10 are to be inserted into these locking grooves. The counterclockwise side end face of the locking groove 32*a* (which is regarded as the locking surface and indicated with the reference number 33*a*) and the clockwise side end face of the locking groove 32*b* (which is regarded as the locking surface and indicated with the reference number 33*b*) are located on substantially the same diameter. By these locking surfaces, the hooks 68*a* and 68*b* at the both ends of the coil spring 10 are locked to the fixed housing 2.

The three auxiliary grooves 34 have the same circumferential width and they are positioned at equal angular intervals in the circumferential direction. On the inner peripheral surface of the free edge portion of the outer peripheral wall 18, axially-locking protrusions 36 are formed. The axially-locking protrusions 36 protrude radially inward corresponding to the respective circumferential angular positions of the three auxiliary grooves 34 for the purpose of positioning the axial position of the shield plate 14. The circumferential width of the axially-locking protrusions 36 is the same as the circumferential width of the auxiliary grooves 34. The auxiliary grooves 34 are formed to help shaping in formation of the axially-locking protrusions 36 on the inner peripheral surface of the outer peripheral wall 18. On the inner peripheral surface of the outer peripheral wall 18 between the ridges 30 and the axially-locking protrusions 36, a pair of circumferentially-locking protrusions 38 for positioning the circumferential position of the shield plate 14 are also formed. The pair of circumferentially-locking protrusions 38 are arranged to face each other in the diameter direction.

Figure 3:
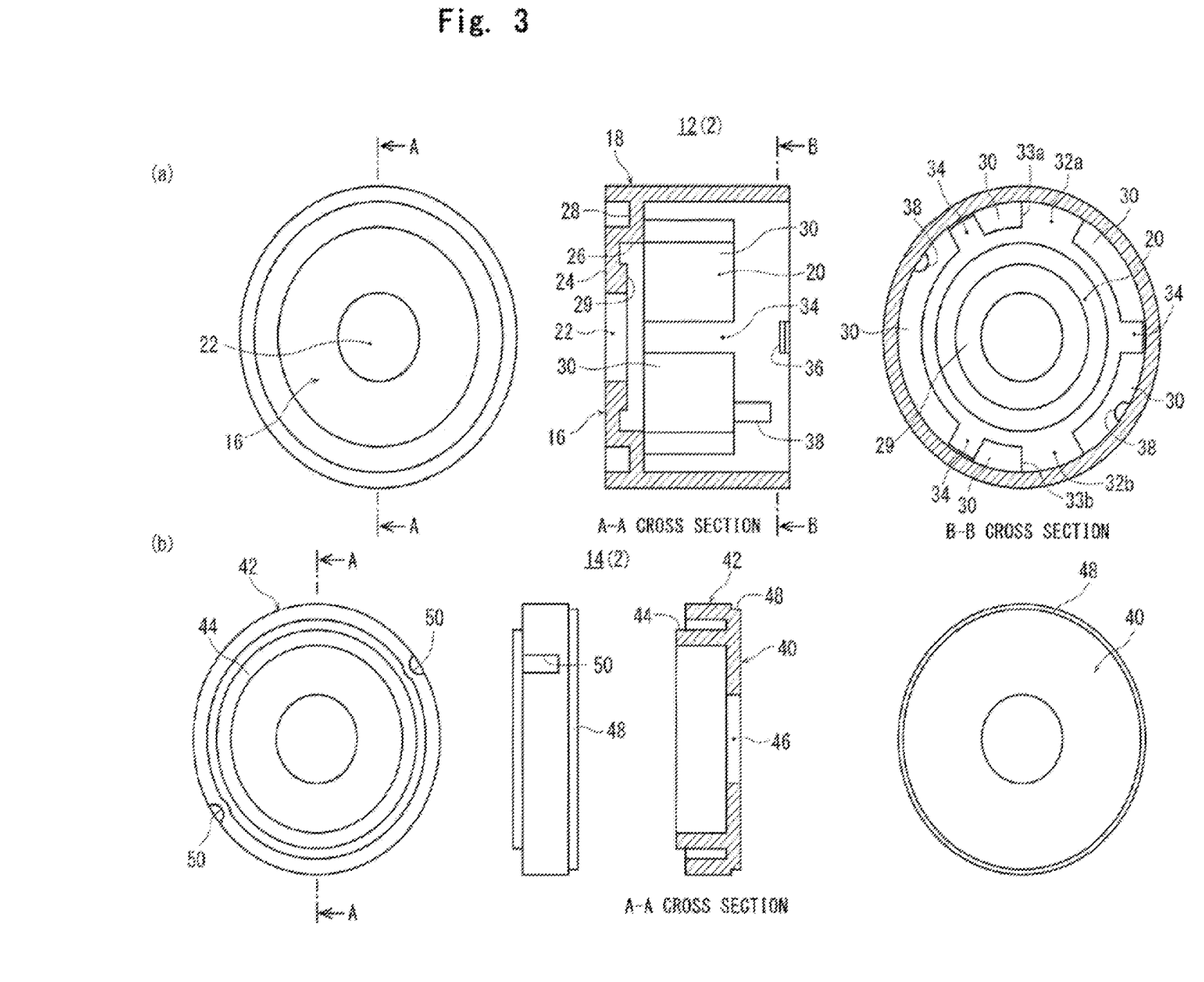
FIG. 3 is composed of diagrams showing a housing of the angular position holding apparatus shown in FIG. 1.

The following explanation refers mainly to FIG. 3 (*b*). The shield plate 14 includes a substrate 40, an exterior wall 42 and an inner wall 44. The substrate 40 is disc-shaped as a whole. Both the exterior wall 42 and the inner wall 44 are shaped cylindrically to extend axially at the outer peripheral edge portion of the substrate 40. The inner wall 44, which is axially longer than the exterior wall 42, functions for positioning the axial end of the coil spring 10 when the shield plate 14 is assembled to the housing body 12 (see A-A cross-sectional view of FIG. 1).

A circular through hole 46 is formed at the center of the substrate 40, and an annular axially-locking groove 48 is formed on the outer peripheral edge portion of the axial end face. Further, a pair of circumferentially-locking grooves 50 are formed on the outer peripheral surface of the exterior wall 42, where the grooves 50 face each other in the diameter direction. The shield plate 14 is combined by a so-called snap fit, namely, fitting at the open end of the housing body 12 by use of elastic deformation after assembling the outer race member 4, the inner race member 6 and the like in the accommodating space 20 of the housing body 12. At this time, the axially-locking protrusions 36 and the circumferentially-locking protrusion 38 of the housing body 12 fit into the axially-locking groove 48 and the circumferentially-locking grooves 50 of the shield plate 14, respectively.

Figure 4:
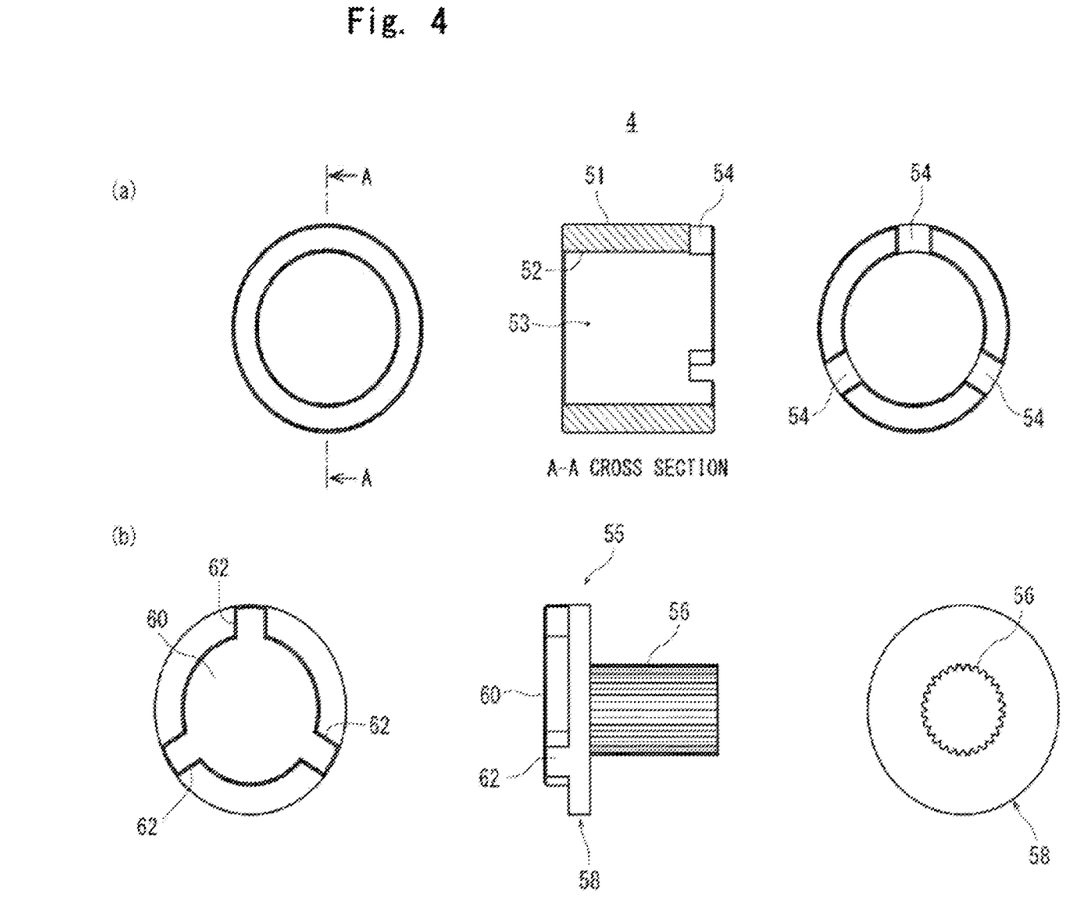
FIG. 4 is composed of diagrams showing an outer race member of the angular position holding apparatus shown in FIG. 1.

The explanation below will be made by referring to FIG. 4 together with FIGS. 1 and 2. The outer race member 4 has a cylindrical shape. Its outer peripheral surface 51 and inner peripheral surface 52 both have circular cross-sections. Inside the outer race member 4, an internal space 53 with circular cross-section is formed.

At one axial end of the outer race member 4, three notches 54 are formed at equal angular intervals in the circumferential direction. Each of these notches 54 is U-shaped so that the axial one end is opened. In this embodiment, the outer race member 4 is connected to a drive source like an electric motor as an input-side device via an input connecting member 55 shown in FIG. 4(*b*) (the input connecting member 55 is also hatched in FIG. 1). The input connecting member 55 includes a shaft 56 to be connected to the drive source, and a flange 58 fixed to the axial distal end of the shaft 56. The flange 58 includes a disc-shaped central fitting portion 60 to fit into the inside of the outer race member 4, and three exterior fitting portions 62 each of which fits into the three notches 54 formed on the outer race member 4. The other end portion in the axial direction of the outer race member 4 is positioned between the annular ridge 29 formed on the end plate 16 of the housing 2 and the intermediate portion 26, whereby it is supported in the radial direction in a rotatable state.

Figure 2:
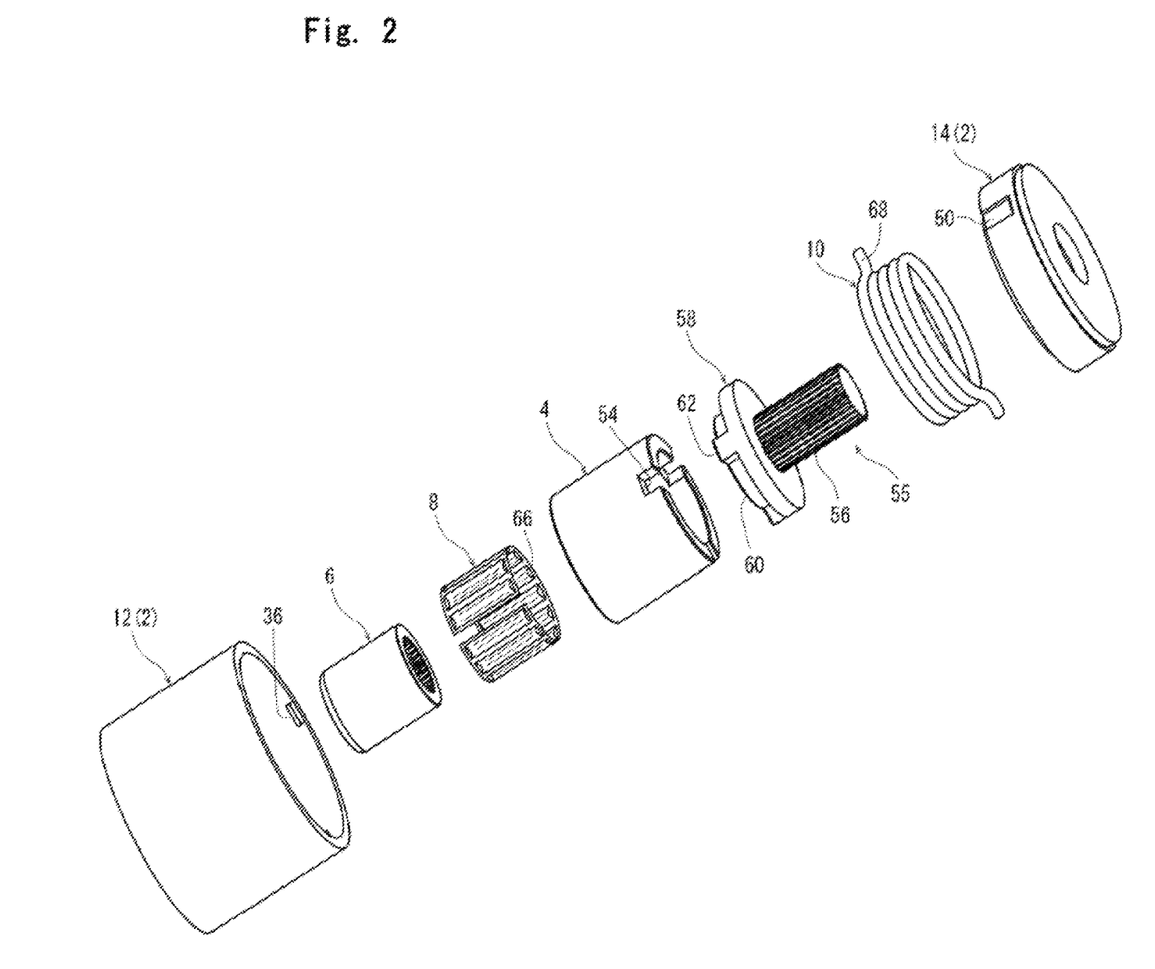
FIG. 2 is an exploded perspective view of the angular position holding apparatus shown in FIG. 1.
Figure 7:
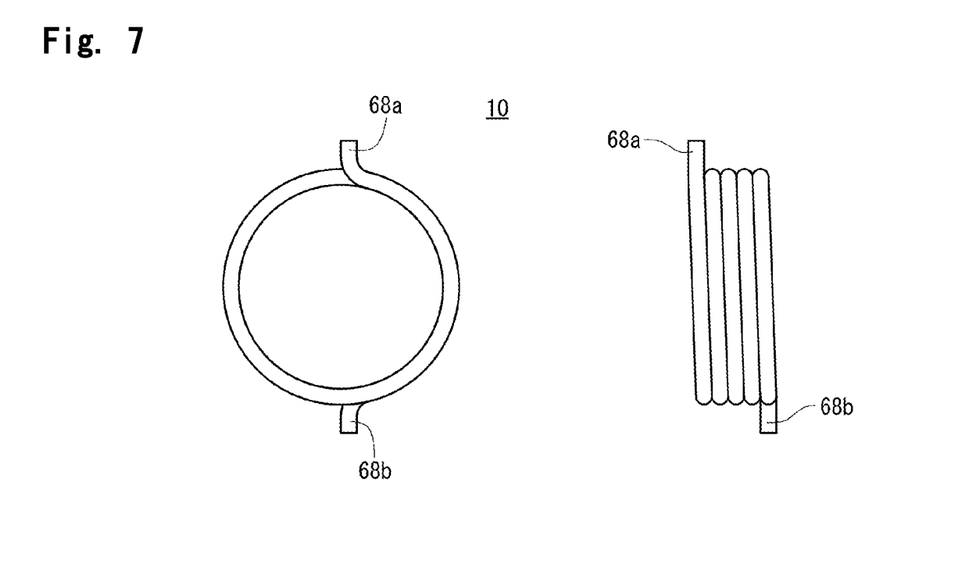
FIG. 7 is composed of diagrams showing a coil spring of the angular position holding apparatus shown in FIG. 1.

As shown in FIGS. 1 and 2, on the outer peripheral surface 51 of the outer race member 4, the coil spring 10 formed by winding a wire (the coil spring 10 is illustrated in FIG. 7) is mounted. The inner diameter in the free state of the coil spring 10 is smaller than the outer diameter of the outer race member 4. The coil spring 10 is mounted to get a close contact with the outer periphery of the outer race member 4, so that a predetermined braking torque is applied to the outer race member 4 by the tightening force of the coil spring 10. That is, the coil spring 10 is a component for performing the same actuation as the torque limiter for keeping the output member to a stop position until the torque from the input member reaches a predetermined value, and it holds the position of the output-side device when no rotation torque is input from the input-side device.

The hooks 68a and 68b extending radially outward are formed at both ends of the coil spring 10. The hooks 68a and 68b are to be inserted respectively into a pair of locking grooves 32a and 32b formed on the housing 2. Here, the hooks 68a and 68b at both ends are inserted into the locking grooves symmetrically. Therefore, when the rotation torque equal to or larger than the braking torque is applied to the outer race member 4, tightening force of the coil spring 10 is decreased to make the outer race member 4 rotate, whether the rotation torque direction is clockwise or counterclockwise.

A lubricant is sealed in the accommodating space 20 of the housing 2 in order to improve the durability of the coil spring 10 and the outer race member 4, to prevent vibration and abnormal noise during the rotation of the outer race member 4. The locking grooves 32a and 32b serve also as oil pockets for reserving and suitably distributing the lubricant. Since the coil spring 10 and the outer race member 4 are made of metal, the lubricant is preferably based on a fluorine from the viewpoint of rust prevention effect.

Figure 5:
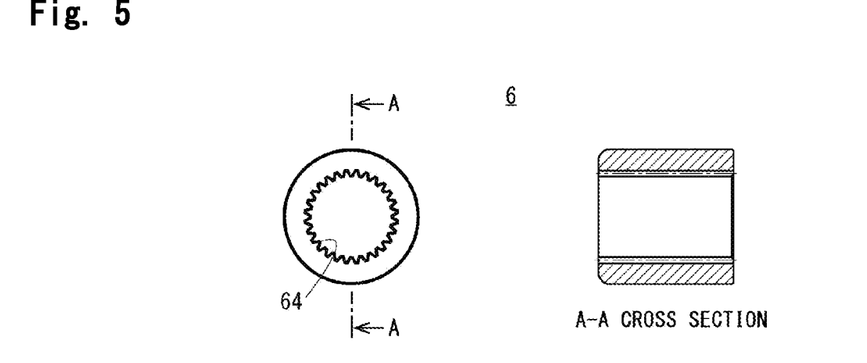
FIG. 5 is composed of diagrams showing an inner race member of the angular position holding apparatus shown in FIG. 1.

Inside the internal space 53 of the cylindrical outer race member 4, the inner race member 6 having an outer peripheral surface with a circular cross section is installed concentrically with the outer race member 4. As shown in FIG. 5, the inner race member 6 in this embodiment is a cylindrical component. On the inner peripheral surface of the inner race member 6, internal teeth 64 for spline fitting are formed, to which a rotation shaft (shown with a two-dot chain line in FIGS. 8 and 9) to be linked to the output-side device such as a hatchback is coupled.

Figure 6:
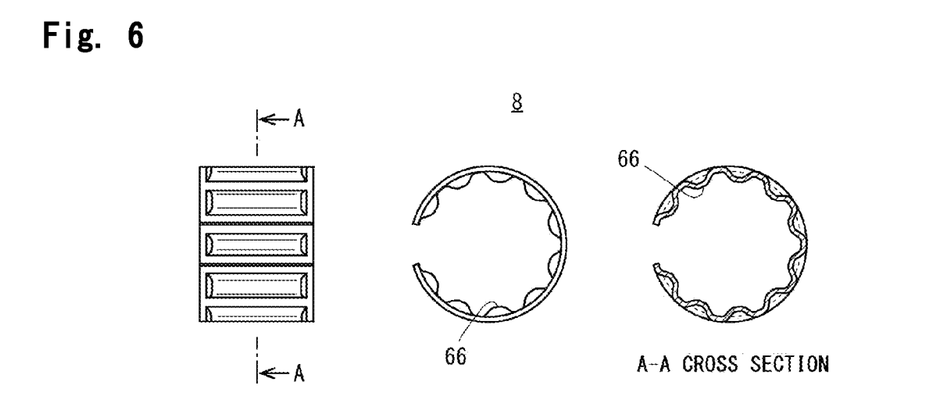
FIG. 6 is composed of diagrams showing a thin-plate elastic piece of the angular position holding apparatus shown in FIG. 1.

In the annular space between the inner peripheral surface 52 of the outer race member 4 and the outer peripheral surface of the inner race member 6, a thin-plate elastic piece 8 constituting a torque limiter for overload prevention is arranged. The thin-plate elastic piece 8 is a metal thin plate having a thickness of 0.05 to 10% the longitudinal length thereof. This plate is shaped by rolling to be substantially cylindrical (C-shape with a gap) as shown in FIG. 6. In the illustrated embodiment, a plurality of projections 66 are formed by pressing or the like on the metal thin plate in advance at intervals in the longitudinal direction. Therefore, on the cylindrically rolled metal thin-plate as described above, all the projections 66 protrude radially inward. In other words, a plurality of irregularities are formed on the thin-plate elastic piece 8. In an embodiment where the thin-plate elastic piece 8 is installed in the annular space outside the inner race member 6, the tops of the projections 66 abut against the outer peripheral surface of the inner race member 6, and the bottoms of the projections 66 (outer periphery of the thin plate elastic piece 8) abut against the inner peripheral surface of the outer race member 4, whereby the outer race member 4 and the inner race member 6 are connected to each other. In A-A cross-sectional view of FIG. 1, the axial length of the thin-plate elastic piece 8 is shorter than the distance between the end plate 16 of the housing 2 and the central fitting portion of the input connecting member 55, whereas the thin-plate elastic piece 8 is capable of exhibiting stably the functions as described below since the annular ridge 29 formed on the end plate 16 of the housing 2 can restrict to some extent axial move of the thin-plate elastic piece 8.

The thin-plate elastic piece is also called a tolerance ring. This is a component to be used also for fixedly mounting the flange-shaped disc on the rotation shaft, and it generates a large elastic force even with a slight deformation. Therefore, a large frictional force is generated between the outer race member 4 and the inner race member 6 even when the thin-plate elastic piece 8 is small. Thereby, it is possible to set the value of torque at which the inner race member 6 rotates (disconnected) relatively to the outer race member 4 to be sufficiently larger than the braking torque applied by the coil spring 10.

The explanation below is made for the operation of the angular position holding apparatus equipped with an overload prevention system of the present invention shown in FIG. 1, with reference to FIGS. 8 and 9.

Figure 8:
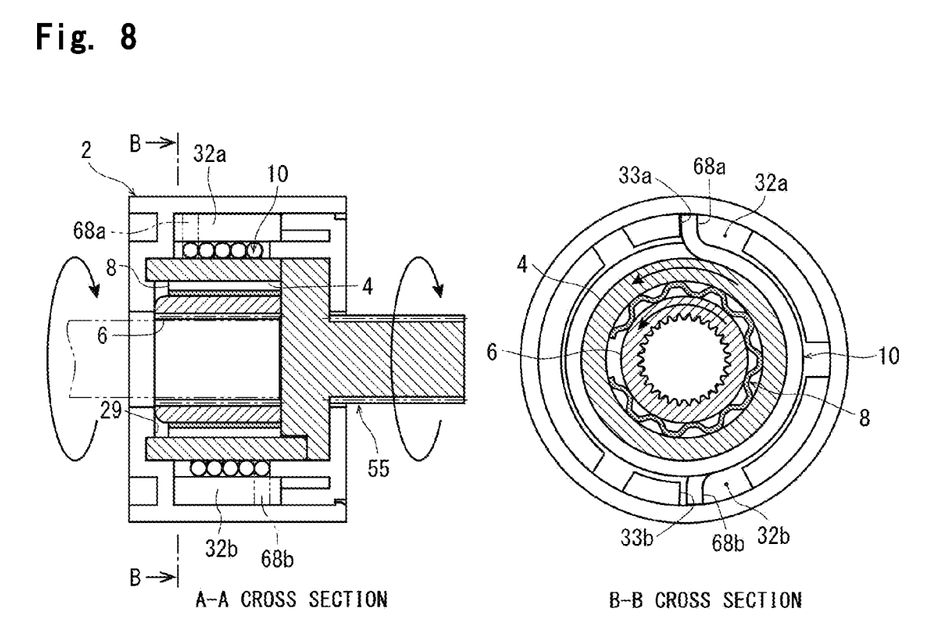
FIG. 8 is composed of diagrams showing an operation for transmitting rotation from the outer race member to the inner race member in the angular position holding apparatus shown in FIG. 1.
Figure 9:
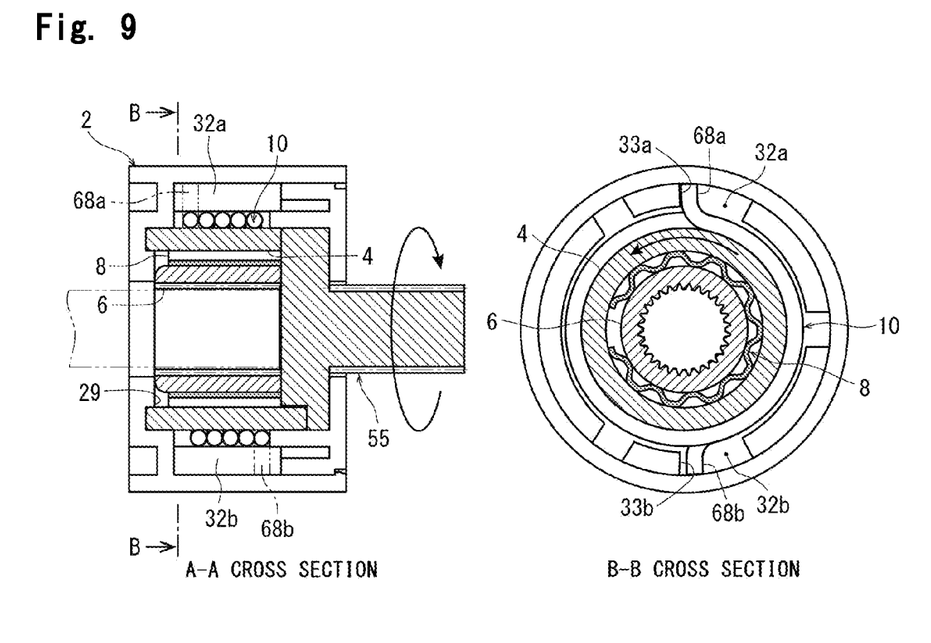
FIG. 9 is composed of diagrams showing an operation during rotation of the outer race member with respect to the inner race member in the angular position holding apparatus shown in FIG. 1.

As indicated by the respective arrows in FIG. 8, the input connecting member 55 is rotated in the counterclockwise direction (viewed from the left side of the A-A cross-sectional view) by an electric motor of the drive source (input-side device), then, the outer race member 4 linked to the input connecting member 55 and the coil spring 10 mounted on the outer peripheral surface thereof attempt to rotate in the counterclockwise direction. In this case, the hook 68a of the coil spring 10 is brought into contact with the locking surface 33a, the hook 68a is pushed in a direction to loosen the coil spring 10. When the rotation torque input to the outer race member 4 exceeds the braking torque, the outer race member 4 starts rotating. At this time, the overload prevention system is not disconnected (i.e., the connection between the outer race member 4 and the inner race member 6 by the thin-plate elastic piece 8 is not cut off), the outer race member 4 and the inner race member 6 rotate integrally. As a result, the rotation of the electric motor opens and closes the hatchback as the output-side device via the rotation shaft indicated by a two-dot chain line. When the input connecting member 55 rotates in the clockwise direction, the rotation of the electric motor is transmitted similarly to the hatchback.

When the rotation of the electric motor is stopped so that the rotation of the outer race member 4 is stopped (i.e., when the rotation torque is not applied to the outer race member 4), the angular position of the outer race member 4 is held by the braking torque applied by the coil spring 10 in a state where the outer race member 4 and the inner race member 6 are connected to each other via the thin-plate elastic piece 8. The braking torque is set to a value larger than the torque acting on the inner race member 6 by the own weight of the hatchback. Therefore, even when the rotation torque is not applied to the outer race member 4, the hatchback does not fall due to its own weight.

When the hatchback is manually applied with an additional torque to exceed the braking torque of the coil spring 10, the outer race member 4 can be rotated. In this case, the output-side device of the angular position holding apparatus of the present invention can be operated manually.

In the process of opening and closing the hatchback by an electric motor, for instance, some obstacle may be caught between the hatchback and the vehicle, thereby causing an abnormal stop of the hatchback. In such a case, excessive torque (which is larger than the braking torque by at least a predetermined value) is generated to the electric motor in an attempt to open and close the hatchback. The excessive torque will be transmitted from the outer race member 4 to the inner race member 6. In the present invention, since the thin-plate elastic piece 8 is interposed between the outer race member 4 and the inner race member 6, slippage occurs at this part so that the outer race member 4 will be rotated while the inner race member 6 remains stopped, as shown in FIG. 9. In this manner, the thin-plate elastic piece 8 functions as a safety system for overload prevention. Namely, it is possible to avoid situations in which an article caught by the hatchback is damaged or an excessive current flows through the electric motor to damage the electric motor.

In the present invention, the coil spring 10 for angular position holding is mounted on the outer peripheral surface of the outer race member 4. And further, a cylindrically-rolled thin-plate elastic piece 8 that functions as a torque limiter for preventing overload is arranged in the internal space 53 formed in the outer race member 4. That is, in the drive system for transmitting rotation from the input-side device to the output-side device, a torque limiter for overload prevention and a torque limiter for holding the angular position are installed in composite at the same position of the same member, whereby a member achievable both functions is downsized for space-saving.

The torque limiter for holding the angular position is intended to use the braking torque of the coil spring 10. By suitably selecting the number of turns and the diameter of the strand of the coil spring 10, it is possible to set the value of the braking torque with high precision. On the other hand, the thin-plate elastic piece 8 constituting the torque limiter for overload prevention has a very large spring constant even if the diameter of circular cross section is small. Therefore, even if the angular position holding apparatus of the present invention is downsized, it is possible to set a high value of torque capable of disconnecting the outer race member 4 from the inner race member 6 (i.e., rotation torque larger than the braking torque by at least a predetermined value).

It should be noted that the angular position holding apparatus of the present invention is not limited to use in a switching system that opens and closes a hatchback as an output-side device by an electric motor as an input-side device, but is applicable a mechanical element for various apparatuses. For instance, it can be applied to an automatic switching system of a toilet seat or lid that is supported in a pivoted manner by a hinge, or an automatic switching system such as a printer cover. The example is not limited to the output-side device to be supported by the hinge, but the inner race member 6 coupled with a converter for converting a rotational-linear motion (e.g., a device for converting the rotation of the gear into linear motion by the rack) can be used for a position holding apparatus of a device like a slide door that performs a linear motion.

Furthermore, in the angular position holding apparatus of the present invention, the outer race member 4 and the inner race member 6 are usually connected integrally by the thin-plate elastic piece 8, so that the braking torque of the coil spring 10 acts equally on the both members. In light of this, the inner race member 6 is connected to the output-side device in the above description. This can be modified such that the outer race member 4 is connected to the input-side device and the input-side device such as an electric motor is connected to the inner race member 6, in use of the apparatus.

Though the angular position holding apparatus of the present invention is described above in detail with reference to the attached figures, the present invention is not limited to the aforementioned embodiments. For instance, the housing body to accommodate every component can be coupled with the shield plate by using any fastener like a screw instead of using a so-called snap fit as in the illustrated embodiment. Furthermore, various modification can be made for the aforementioned embodiment. For instance, in the illustrated embodiment, a spline is provided on the inside of the inner race member for coupling with the rotation shaft linked to the output-side device. Instead, it is possible to fasten by providing a flange to the inner race member and to the rotation shaft.

EXPLANATIONS OF LETTERS OR NUMERALS

2: Housing
4: Outer race member
6: Inner race member
8: Thin-plate elastic piece
10: Coil spring
32*a*, 32*b*: Locking grooves
55: Input connecting member
68*a*, 68*b*: Hooks

The invention claimed is:

1. An angular position holding apparatus for applying a braking torque to hold a position of an output-side device when no rotation torque is input from an input-side device, the angular position holding apparatus comprising:
   an outer race member and an inner race member each rotatable about a common central axis and each having an outer peripheral surface with a circular cross section, one of the outer race member or the inner race member being connectable to the input-side device and another of the outer race member or the inner race member being connectable to the output-side device; and
   a coil spring mounted on the outer peripheral surface of the outer race member, the coil spring in a free state having an inner diameter smaller than an outer diameter of the outer race member, and the coil spring having hooks at both ends that are locked to a fixed member in order to apply braking torque to the outer race member, wherein
   an internal space having a circular cross section to accommodate the inner race member is formed in the outer race member, and a cylindrically-rolled thin-plate elastic piece is installed between an inner peripheral surface of the outer race member and the outer peripheral surface of the inner race member so that the cylindrically-rolled thin-plate elastic piece is brought into contact with the inner peripheral surface of the outer race member and the outer peripheral surface of the inner race member, the outer race member and the inner race member rotate integrally against the braking torque when a rotation torque input from the input-side device is larger than the braking torque, and connection by the cylindrically-rolled thin-plate elastic piece between the outer race member and the inner race member is cut off to make the outer race member and the inner race member rotate relatively when a rotation torque larger than the braking torque by at least a predetermined value is generated between the outer race member and the inner race member.

2. The angular position holding apparatus according to claim 1, wherein the outer race member is a cylindrical member having the outer peripheral surface with the circular cross section and the internal space with the circular cross section, and the inner race member to be accommodated in the internal space is set to have an axial length not longer than an axial length of the outer race member.

3. The angular position holding apparatus according to claim 2, wherein a plurality of irregularities are formed on the cylindrically-rolled thin-plate elastic piece.

4. The angular position holding apparatus according to claim 2, further comprising a fixed housing for accommodating the outer race member and the inner race member, wherein the fixed housing is formed with locking grooves into which the hooks at the both ends of the coil spring are to be inserted.

5. The angular position holding apparatus according to claim 4, wherein the fixed housing includes a housing body having an end plate and an outer peripheral wall extending axially from a peripheral edge of the end plate, and a shield plate for sealing an open end of the housing body, and axially-locking protrusions and circumferentially-locking protrusions are formed at intervals in a circumferential direction at an open end portion of the outer peripheral wall, and an axially-locking groove corresponding to the axially-locking protrusions and circumferentially-locking grooves corresponding to the circumferentially-locking protrusions are formed on an outer peripheral surface of the shield plate.

6. The angular position holding apparatus according to claim 1, wherein a plurality of irregularities are formed on the cylindrically-rolled thin-plate elastic piece.

7. The angular position holding apparatus according to claim 6, further comprising a fixed housing for accommodating the outer race member and the inner race member, wherein the fixed housing is formed with locking grooves into which the hooks at the both ends of the coil spring are to be inserted.

8. The angular position holding apparatus according to claim 7, wherein the fixed housing includes a housing body having an end plate and an outer peripheral wall extending axially from a peripheral edge of the end plate, and a shield plate for sealing an open end of the housing body, and axially-locking protrusions and circumferentially-locking protrusions are formed at intervals in a circumferential direction at an open end portion of the outer peripheral wall, and an axially-locking groove corresponding to the axially-locking protrusions and circumferentially-locking grooves corresponding to the circumferentially-locking protrusions are formed on an outer peripheral surface of the shield plate.

9. The angular position holding apparatus according to claim 1, further comprising a fixed housing for accommodating the outer race member and the inner race member, wherein the fixed housing is formed with locking grooves into which the hooks at the both ends of the coil spring are to be inserted.

10. The angular position holding apparatus according to claim 9, wherein the fixed housing includes a housing body having an end plate and an outer peripheral wall extending axially from a peripheral edge of the end plate, and a shield plate for sealing an open end of the housing body, and axially-locking protrusions and circumferentially-locking protrusions are formed at intervals in a circumferential direction at an open end portion of the outer peripheral wall, and an axially-locking groove corresponding to the axially-locking protrusions and circumferentially-locking grooves corresponding to the circumferentially-locking protrusions are formed on an on the outer peripheral surface of the shield plate.

11. The angular position holding apparatus according to claim 10, wherein a fluorine-based lubricant is encapsulated in the fixed housing.

12. The angular position holding apparatus according to claim 9, wherein a fluorine-based lubricant is encapsulated in the fixed housing.

* * * * *